(12) United States Patent
Earhart et al.

(10) Patent No.: US 8,128,377 B2
(45) Date of Patent: Mar. 6, 2012

(54) SPLIT-PRESSURE DUAL PUMP HYDRAULIC FLUID SUPPLY SYSTEM FOR A MULTI-SPEED TRANSMISSION AND METHOD

(75) Inventors: David E. Earhart, Brownsburg, IN (US); Dane L. Rodgers, II, Avon, IN (US)

(73) Assignee: GM Global Technology Operations LLC, Detroit, MI (US)

( * ) Notice: Subject to any disclaimer, the term of this patent is extended or adjusted under 35 U.S.C. 154(b) by 1640 days.

(21) Appl. No.: 11/695,890

(22) Filed: Apr. 3, 2007

(65) Prior Publication Data

US 2008/0247882 A1    Oct. 9, 2008

(51) Int. Cl.
*F04B 49/00*    (2006.01)

(52) U.S. Cl. .............................. 417/216; 417/2; 417/287

(58) Field of Classification Search .............. 417/2, 216, 417/286, 287
See application file for complete search history.

(56) References Cited

U.S. PATENT DOCUMENTS

| | | | |
|---|---|---|---|
| 3,962,870 A * | 6/1976 | Lech | 60/428 |
| 3,985,472 A * | 10/1976 | Virtue et al. | 417/216 |
| 4,050,478 A | 9/1977 | Virtue et al. | |
| 4,342,545 A | 8/1982 | Schuster | |
| 4,819,430 A * | 4/1989 | Becker | 60/421 |
| 5,165,862 A * | 11/1992 | Lindblom | 417/216 |
| 5,842,837 A * | 12/1998 | Nakayoshi et al. | 417/286 |
| 6,029,445 A | 2/2000 | Lech | |
| 6,106,240 A | 8/2000 | Fischer et al. | |
| 6,361,287 B1 * | 3/2002 | Hopper | 417/286 |
| 6,425,748 B1 | 7/2002 | Miller | |
| 6,558,132 B2 | 5/2003 | Hanggi | |
| 6,579,070 B1 * | 6/2003 | Birkenmaier et al. | 417/216 |
| 6,848,548 B2 * | 2/2005 | Alfredsson | 192/3.25 |

* cited by examiner

*Primary Examiner* — Devon C Kramer
*Assistant Examiner* — Peter J Bertheaud
(74) *Attorney, Agent, or Firm* — Quinn Law Group, PLLC

(57) ABSTRACT

A split-pressure, dual-pump system for supplying hydraulic fluid to a multi-speed transmission is provided. The system includes a low-pressure work circuit operatively connected to a fixed displacement pump, and a high-pressure work circuit operatively connected to a variable displacement pump. The system also includes a regulator valve fluidly coupled to the variable displacement pump via a decrease circuit and an overage circuit for regulating the flow of fluid to the high-pressure work circuit. The invention consists of separating the high-pressure needs of the system into a separate work circuit from the low-pressure needs of the system, and optimizing pump design separately for each work circuit to maximize transmission efficiency and reduce parasitic losses. A method of supplying hydraulic fluid to a multi-speed transmission at variable flow and pressure is also provided.

16 Claims, 4 Drawing Sheets

SPLIT-PRESSURE DUAL PUMP HYDRAULIC FLUID SUPPLY SYSTEM FOR A MULTI-SPEED TRANSMISSION AND METHOD

TECHNICAL FIELD

The present invention relates to hydraulic fluid control systems, namely oil supply systems for multi-speed transmissions having dual pumps working in unison and controlled by a regulating valve.

BACKGROUND OF THE INVENTION

Automotive and commercial vehicles include a powertrain that is comprised of an engine, a multi-speed transmission, and a differential or final drive. The multi-speed power transmission requires a supply of pressurized fluid to properly operate. The pressurized fluid may be used for such functions as cooling, lubrication, and torque converter operation. It is well known that the lubricating and cooling capabilities of transmission oil systems greatly impact the reliability and durability of the transmission. Additionally, multi-speed power transmissions require the hydraulic system to provide controlled engagement and disengagement, on a desired schedule, of the various torque transmitting mechanisms that operate to establish the speed ratios within the internal gear arrangement.

Transmissions are traditionally supplied with hydraulic fluid by a wet sump (i.e., single-pump, internal reservoir), cascading oil system, which is separate from the engine oil system. The fluid is typically stored in a main reservoir or main sump volume where it is introduced to a pickup or inlet tube for communication to the single hydraulic pump. The pump operates to pressurize the fluid for subsequent communication to the transmission.

It is well known to utilize one or more fixed displacement (or "PF", according to industry custom) pumps in multi-speed transmissions. A PF pump can generate relatively instantaneous pressure and flow to a hydraulic circuit when the circuit is opened due to the positive displacement characteristic of PF type pumps.

A high-pressure PF pump serves a number of important roles. First, high oil pressure has traditionally been required to maintain torque converter charge pressure, which is the torque converter oil inlet pressure at the centerline of the transmission. It is necessary to maintain this pressure to avoid cavitation, which is not only inefficient, but can be damaging to the internal componentry of the torque converter. More notably, the high-pressure pump supplies the fluid pressure necessary to selectively apply the transmissions torque transmitting mechanisms. The single PF pump is required to satisfy both the high-pressure/low-flow requirements while simultaneously satisfying the low-pressure/high-flow requirements. The single PF system is inefficient in applications requiring high-pressure fluid because the PF pump continues to deliver high flow, high pressure fluid even when only low pressure and/or low flow is needed. Hence, the single PF pump is expending power equal to its total output flow and pressure (i.e., high-pressure and high-flow), even though the transmission is using only a portion of that flow. This parasitic loss results in unnecessary consumption of power from the motor vehicle engine or battery and may tend to reduce the overall life of the pump.

In systems where the hydraulic circuit has a relief valve, the valve will "dump" excess fluid flow as it is being pumped by the PF pump, thereby generating undesirable heat in the hydraulic fluid. Multiple PF pump systems are designed to minimize this undesirable behavior by having a different PF pump that can be called upon to deliver a required fluid flow or pressure depending upon the operating conditions. However, PF systems with multiple pumps still have the high pressure deficiencies mentioned above.

A common type of PF pump used in multi-speed transmissions is a gerotor pump ("GP"). The GP includes a ring gear supported by a pump housing. In addition, a pinion gear is rotatably mounted inside the ring gear for rotation about parallel, laterally separated centerlines. The teeth on the respective gears cooperate to define a plurality of variable volume pumping chambers. During rotation of the gear members, each pumping chamber expands in an inlet half, and collapses in a discharge half. Fluid from the GP's low-pressure, inlet port is drawn into pumping chambers that are increasing in volume. Upon further rotation, when the pumping chambers are decreasing in volume, the fluid is pushed out through the pump's outlet or discharge port at a higher pressure. The inlet and the discharge ports are separated angularly or "timed" to prevent the pump chambers from simultaneously overlapping both the inlet port and the discharge port.

It is also known to use a single variable displacement (or "PV", according to industry custom) pump to satisfy the hydraulic fluid needs of a multi-speed transmission. The PV pump produces a variable flow on demand. Thus, in standby conditions, PV pump systems do not circulate as much hydraulic fluid.

A single PV pump traditionally employs a rotor having multiple slots circumferentially disposed about the rotor, wherein a plurality of vanes are slidably disposed, and a slide member to vary the volume of fluid delivered to a hydraulic work circuit. The slide member is eccentrically offset from the rotor to create fluid chambers defined by the vanes, rotor, and inner surface of the slide. A compression spring, connected to a regulator arm on the periphery of the slide, positions the slide to create large fluid chambers as the default. When the transmission requires less fluid, a pressure regulator directs fluid from the pump output line to a regulating chamber in the PV pump. Pressure in the regulating chamber pivots the slide against the force of the spring to more closely align the centers of the rotor and slide, reducing the eccentricity offset, thereby reducing the size of the fluid chambers. This reduces the amount of fluid drawn into the pump from the fluid reservoir and likewise, the amount of fluid output by the pump.

SUMMARY OF THE INVENTION

A hydraulic fluid supply system is provided that utilizes a split-pressure work circuit configuration in cooperation with first and second pumps to continuously deliver variable flow, high-pressure fluid and fixed flow, low-pressure fluid, depending on the individual needs of two independent work circuits.

In one embodiment of the present invention, a split-pressure hydraulic fluid supply circuit for supplying pressurized fluid to a multi-speed transmission is provided. The transmission has a power source for driving the hydraulic system, and one or more reservoirs for storing and supplying the system with hydraulic fluid. The split-pressure hydraulic fluid supply circuit includes a first pump, a second pump, a low-pressure circuit portion, and a high-pressure circuit portion. The first pump has both inlet and outlet ports, and is driven by the power source to provide a continuous flow of pressurized hydraulic fluid at a fixed rate. The second pump has an inlet port, an outlet port, and a regulator port, and is driven by the power source to provide a continuous flow of pressurized hydraulic fluid at variable rates. The low-pressure circuit portion includes a low-pressure work circuit fluidly coupled to the first pump. The low-pressure circuit portion is preferably adapted to supply all of the low-pressure hydraulic fluid necessitated by the multi-speed transmission. The high-pressure circuit portion includes a high-pressure work circuit fluidly coupled to the second pump. The high-pressure circuit portion is preferably adapted to supply all of the high-pressure hydraulic fluid necessitated by the multi-speed transmission. It is further preferred that there be no fluid coupling between the high-pressure work circuit and the low-pressure work circuit.

In a preferred embodiment, the first pump is a fixed displacement ("PF") pump and the second pump is a variable displacement ("PV") pump. However, it is also considered to be within the scope of the present invention that both pumps be PV pumps. It is preferred that the high-pressure work circuit is not fluidly coupled to the first pump, and the low-pressure work circuit is not fluidly coupled to the second pump. In this preferred embodiment, the invention separates the low-flow, high-pressure needs of the transmission into a separate work circuit from the high-flow, low-pressure needs, and optimizes pump design separately for each circuit portion to maximize transmission efficiency. The combination of a PF pump and PV pump in a regulated system has the advantage of the instant acting fluid delivery inherent in a fixed displacement pump, and the high pressure, low horsepower consuming characteristics available with a variable displacement pump. A combination pump system therefore maximizes performance, efficiency, and dependability while minimizing costs.

In a second embodiment, an oil pump assembly is provided. The oil pump assembly includes a fixed displacement PF pump, a variable displacement PV pump, a regulator, and one or more power sources connected to the oil pump assembly. One or more reservoirs are fluidly coupled to the oil pump assembly in order to store and supply hydraulic fluid to both the PF and the PV. The power source(s) drive the fixed displacement pump and the variable displacement pump in order to supply hydraulic pressure.

The oil pump assembly includes a plurality of hydraulic conduits for transferring oil to and from the PF and PV pumps. A first conduit defines a low-pressure work circuit for supplying a continuous flow of oil at low pressure and a fixed rate. The low-pressure work circuit is fluidly coupled to the PF pump, but is not fluidly coupled to the PV pump. A second conduit defines a high-pressure work circuit for supplying a continuous flow of oil at high-pressure and variable rates. The high-pressure work circuit is fluidly coupled to the PV pump, but is not fluidly coupled to the PF pump. It is preferred, but not required, that the low-pressure work circuit supply only low-pressure hydraulic fluid at a high flow, and the high-pressure work circuit supply only high-pressure hydraulic fluid at either a high flow or a low flow.

The oil pump assembly also includes a third conduit which defines a decrease circuit that is fluidly coupled to the regulator and the PV pump for reducing the flow of fluid to the high-pressure work circuit. It is preferred that there is no fluid coupling between the decrease circuit and either the PF pump or the reservoir. The oil pump assembly preferably also includes a fourth conduit that defines an overage circuit. The overage circuit is fluidly coupled to the regulator and the PV pump, but is not fluidly coupled to the PF pump. The overage circuit is a "backup" feature for further reducing the flow of fluid to the high-pressure work circuit when the decrease circuit is at full capacity and the PV pump is still pumping more fluid then demanded by the high-pressure work circuit.

An additional aspect of the present invention is to provide a novel method of supplying a variable flow of pressurized hydraulic fluid to a multi-speed transmission. The method includes the steps of: pumping a fixed flow of low-pressure fluid to a low-pressure work circuit using a fixed displacement pump; pumping a variable flow of high-pressure fluid to a high-pressure work circuit using a variable displacement pump; and, operating the fixed displacement pump to supply fluid to the low-pressure work circuit at substantially the same time as the variable displacement pump supplies fluid to the high-pressure work circuit. It is preferred that the high pressure work circuit is not fluidly coupled to the low pressure work circuit or the PF pump. The method may also include, as an additional step, regulating the flow of high-pressure fluid into the high-pressure work circuit with a decrease circuit that is fluidly coupled to the PV pump and not fluidly coupled to the low-pressure work circuit or the reservoir.

The above features and advantages, and other features and advantages of the present invention, will be readily apparent from the following detailed description of the preferred embodiments and best modes for carrying out the invention when taken in connection with the accompanying drawings.

DESCRIPTION OF THE PREFERRED EMBODIMENTS

Figure 1:
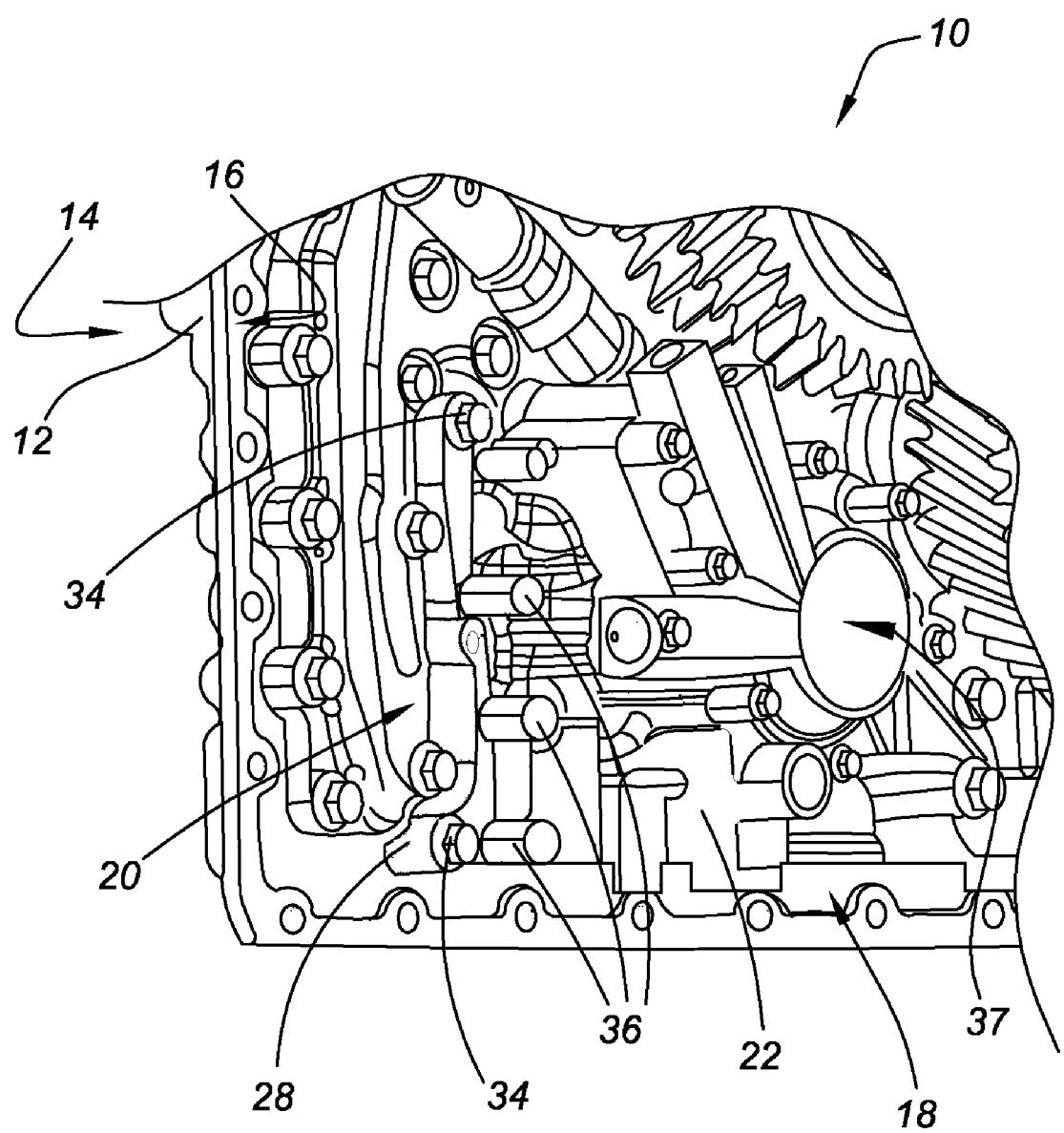
FIG. 1 is a partial perspective view of a split-pressure, dual-pump oil assembly illustrating a variable pump mounted face-to-face with a fixed displacement pump on a transmission housing in accordance with the present invention.

Referring to the drawings, wherein like reference numbers refer to like components throughout the several views, FIG. 1 illustrates an oil pump assembly or oil pump system, shown generally as 10, in accordance with the present invention. The oil pump assembly 10, described herein for supplying hydraulic fluid to a multi-speed power transmission (not shown) of an automobile (not shown), may also be applied in other various applications, such as, by way of example, aeronautical vehicles (e.g., airplanes, helicopters, etc.), agricultural vehicles (e.g., combine, tractor, etc.), construction vehicles (e.g., forklift, backhoe, excavator, etc.), and stationary machines (e.g., hydraulic press, hydraulic drill, etc.).

Figure 3:
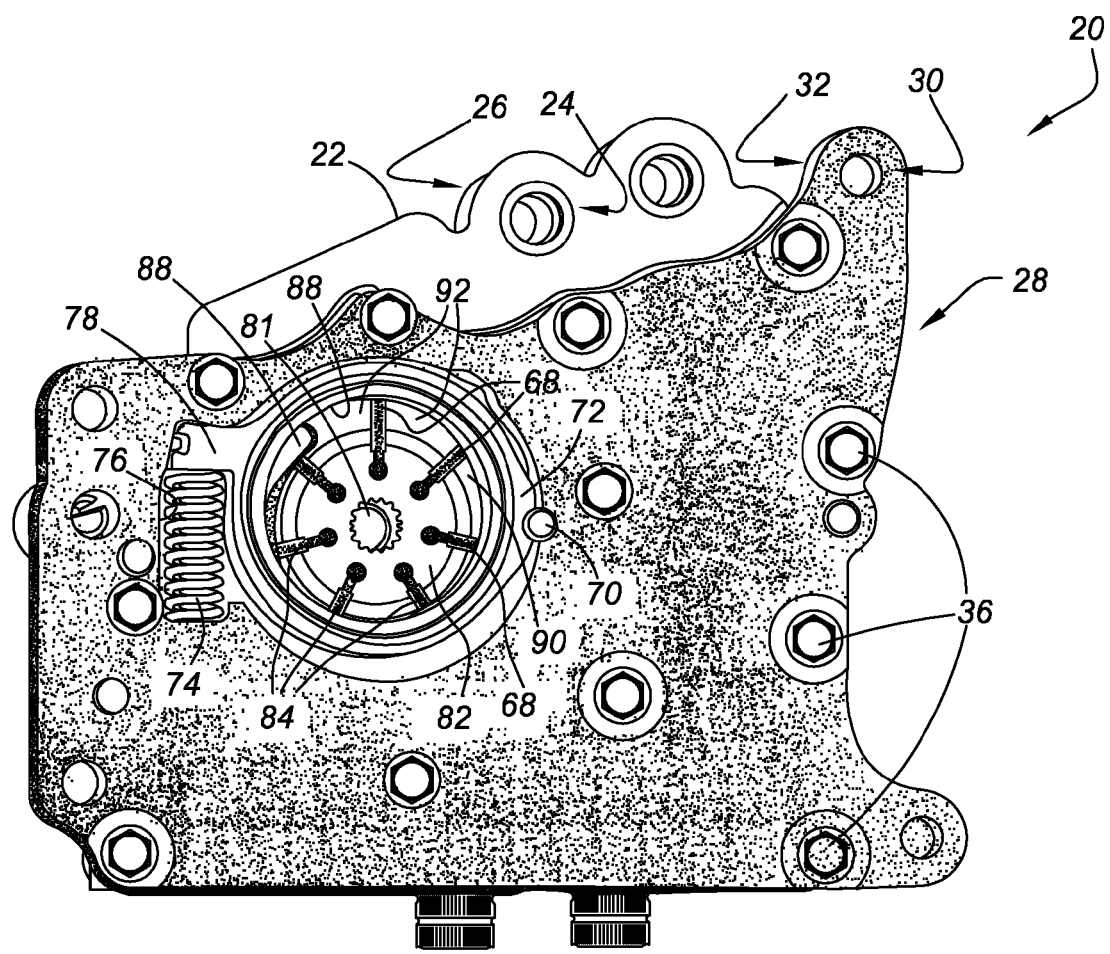
FIG. 3 is a perspective front view of a vane-type variable displacement pump as exemplary of a variable displacement pump in accordance with the embodiments of FIGS. 1 and 2.

The oil pump assembly 10 includes an assembly housing 12 having opposing front and rear faces 14, 16 (FIG. 1), respectively, and a first pump 18 in face-to-face relation with a second pump 20. The first pump 18 (illustrated in an exemplary embodiment in FIG. 4) is preferably a fixed displacement pump of the positive displacement type (also referred to herein as "PF"), and the second pump 20 (illustrated in an exemplary embodiment in FIG. 3) is a variable displacement pump (also referred to herein as "PV"), as is understood by those skilled in the art. It is also considered to be within the scope of the present invention that both pumps 18, 20 be PV pumps. The first pump 18 includes a pump body 22 having opposing front and rear faces 24, 26, respectively (illustrated in FIG. 4). The second pump 20 includes a pump body 28 having opposing front and rear faces 30, 32, respectively (illustrated in FIG. 3). As seen in FIG. 1, the front face 30 of the second pump 20 is secured in a face-to-face relation to the rear face 16 of the assembly housing 12 by, e.g., bolts 34. As seen in FIG. 3, the front face 24 of the first pump 18 is secured to the rear face 32 of the second pump 20 by, for example, bolts 36. Those having ordinary skill in the art will appreciate that the housing assembly 12 depicted in FIG. 1 may include any convenient structural member commonly associated with the transmission or surrounding vehicle structure (not shown).

Figure 2:
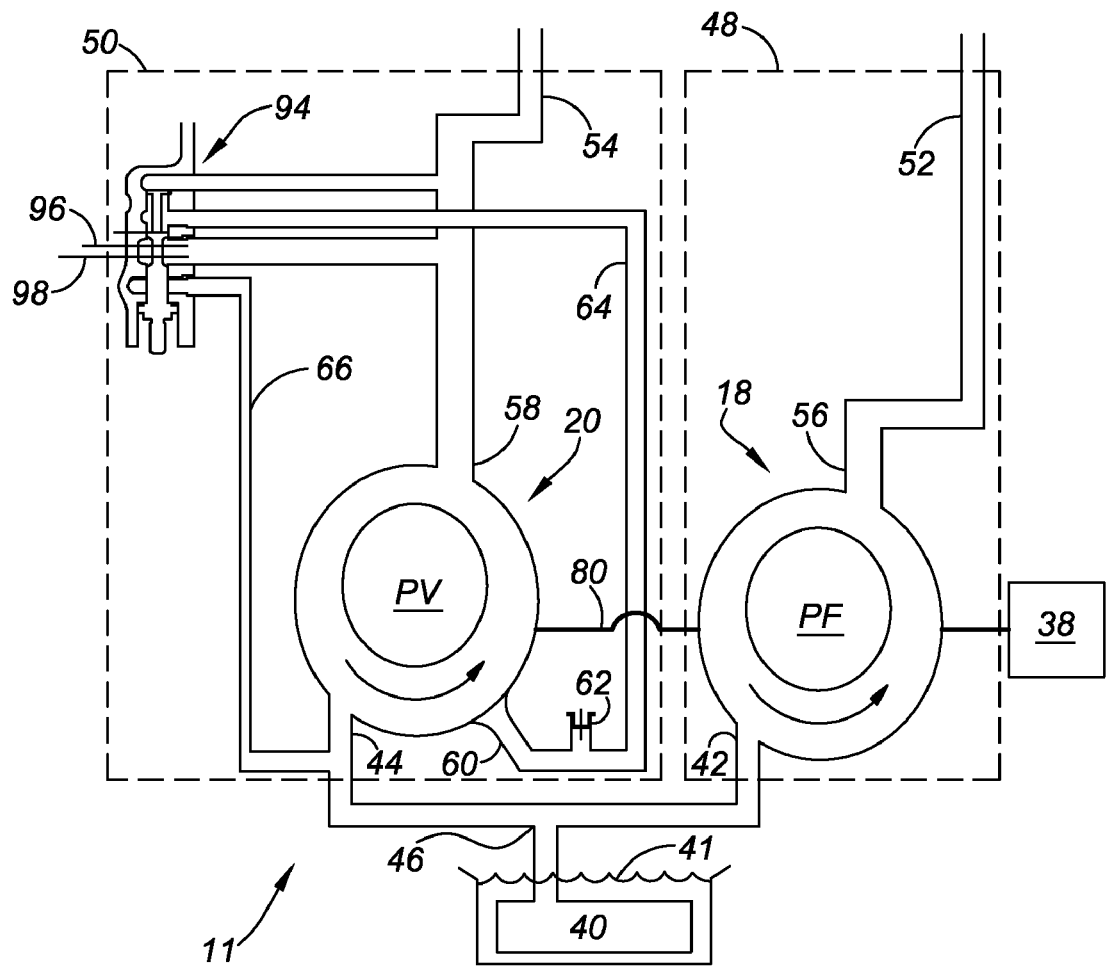
FIG. 2 is a schematic illustration of a split-pressure, dual-pump hydraulic fluid supply circuit in accordance with the split-pressure, dual-pump oil assembly of FIG. 1.

The oil pump assembly 10 also includes a power source 38, depicted schematically in FIG. 2, to communicate a driving force to both the first and second pumps 18, 20. It should be recognized that FIG. 2 is only a schematic representation and alternate methods of pump driving are available, including, e.g., the vehicle's engine, an electric motor, and the like. Furthermore, the oil pump assembly 10 may include multiple power sources for driving each of the first and second pumps 18, 20.

The oil pump assembly 10 preferably includes or is in fluid communication with a single internal reservoir, depicted generally as 40 in FIG. 2, commonly referred to as a sump volume, in fluid communication with an inlet port 42 of the first pump 18 and an inlet port 44 of the second pump 20 via a pickup or reservoir circuit 46. However, the oil pump assembly 10 may include multiple reservoirs, and the reservoir(s) 40 may be packaged at locations outside of the pump assembly 10. The reservoir 40 stores and supplies the hydraulic fluid 41 (i.e., oil) pressurized and fed to the transmission by the oil pump assembly 10, as understood by those skilled in the art.

Turning to FIG. 2 of the drawings, a partial schematic view of a dual-pump, split-pressure hydraulic fluid supply circuit, shown generally as 11, is illustrated in accordance with the oil pump assembly 10 of FIG. 1. The dual-pump, split-pressure hydraulic fluid supply circuit, referred to hereinafter as DPSP 11, includes a low-pressure side or circuit portion, identified generally by the dashed box 48, and a high-pressure side or circuit portion, identified generally by the dashed box 50.

The low-pressure circuit portion 48 includes a low-pressure work circuit 52 fluidly coupled to the first pump 18 via outlet port 56. The first pump 18 is driven by the power source 38 to provide a continuous or uninterrupted flow of pressurized hydraulic fluid 41 at a fixed rate, depending upon the needs of the low-pressure work circuit 52. The low-pressure circuit portion 48 is preferably adapted to supply all of the low-pressure hydraulic fluid necessitated by the multi-speed transmission.

The high-pressure circuit portion 50 includes a high-pressure work circuit 54 fluidly coupled to the second pump 20 via outlet port 58. The second pump 20 also includes a regulator port 60 having an orifice 62, and is driven by the power source 38 to provide a continuous or uninterrupted flow of pressurized hydraulic fluid 41 at variable rates, depending upon the needs of the high-pressure work circuit 54. The orifice 62 is located between the regulator port 60 of the second pump 20 and a regulator valve 94. The orifice 62 functions acts as a hydraulic damper and exhaust. The high-pressure circuit portion 50 is preferably adapted to supply all of the high-pressure hydraulic fluid necessitated by the multi-speed transmission. In other words, the DPSP 11 separates the high-pressure needs of the transmission into a separate work circuit from the low-pressure needs, and optimizes pump design separately for each side or circuit portion 48, 50 to maximize transmission efficiency and reduce parasitic losses.

By splitting the high- and low-pressure work circuits 52, 54, respectively, along with the use of the second pump 20 for supplying the high-pressure work circuit 54, the oil pump system 10 is more efficient because the second pump 20 can be selectively regulated to supply a low rate of flow, while the first pump 18 is putting out a high rate of flow. High-flow/high-pressure hydraulic fluid is only needed intermittently when a torque transmitting mechanism (i.e., a clutch, not shown) is being filled, whereas high-flow/low-pressure fluid is needed continuously for lubrication and cooling purposes. Less power is consumed by the oil pump assembly 10 because the low-pressure circuit portion 48 is separated from the high-pressure circuit portion 50; thus, the low-pressure work circuit 48 does not require an initial supply of hydraulic fluid 41 at high-pressure, and thereafter be cascaded down to a lower pressure, as in traditional wet sump, cascading oil systems, which unnecessarily consumes power and produces heat, as explained above. It should be noted that the high pressure work circuit 54 is not restricted to filling the aforementioned torque transmitting mechanisms. In the same regards, the low pressure work circuit 52 is not restricted to cooling and lubrication purposes. A work circuit, as understood by those skilled in the art, may include one or more of a hydrostatic or hydraulic transmission means (not shown), direction control means (not shown), and any other unspecified fluid operated apparatus as can be imagined. By way of example, the low-pressure work circuit 52 may be employed to supply the torque converter (not shown) with hydraulic fluid 41, and the high-pressure work circuit 54 may have additional internal actuators (not shown) that require hydraulic fluid 41 at high-pressure.

As depicted in FIG. 2, there is no fluid coupling between the high-pressure work circuit 54 and the low-pressure work circuit 52. It is also preferred that the high-pressure work circuit 54 is not fluidly coupled to the first pump 18, and the low-pressure work circuit 52 is not fluidly coupled to the second pump 20.

Now referring to FIG. 3 of the drawings, the second (PV) pump 20, in accordance with the embodiments of FIGS. 1-2, is depicted in an exemplary embodiment as a vane-type PV pump. The second (PV) pump 20 includes a pivot pin 70 mounted to the pump body 28. A ring member, also referred to as a slide 72, is pivotally mounted on the pivot pin 70. The slide 72 is urged to the position shown in FIG. 3 by a compression spring 74, which is disposed in a cylindrical opening 76 formed in the pump body 28, and abuts a regulator arm 78 formed on the slide 72.

A pump drive shaft, depicted schematically in FIG. 2 as 80, is rotatably mounted to the assembly housing 12 through a needle bearing (not shown) or the like. The drive shaft 80 is drivingly connected to a coupling feature, such as spline 81 formed in a pump rotor 82, which is slidably disposed on an inner peripheral side of the slide 72. The pump rotor 82 has a plurality of circumferentially disposed radial slots 84 formed therein. Within each slot 84 is slidably disposed a vane member 68. The vanes 68 are urged radially outward by vane positioning rings (not shown) and centrifugal force towards an inner cylindrical surface 86 of the slide 72

The pump body 28 has formed therein a pair of kidney shaped ports, acting as an inlet port 88 and an outlet port 90. A plurality of fluid chambers 92 are formed by the rotor 82, vanes 68, and an inner cylindrical surface 86 of the slide 72, and are successively connected to the inlet and outlet ports 88, 90. The chambers 92 rotate with the rotor 82 (indicated by the directional arrows in FIG. 2) and expand and contract during rotation due to an eccentric offset between the slide 72 and rotor 82. The chambers 92 expand in the area of the inlet port 88, which accepts hydraulic fluid 41 from the reservoir 40, and passes it to the chambers 92. Thereafter, the chambers 92 contract in the area of the outlet port 90 to discharge the hydraulic fluid 41 through the outlet port 90 to the high pressure work circuit 54.

Referring again to FIG. 2, the high pressure circuit portion 50 further includes a decrease circuit 64 fluidly connected to the regulator valve 94 and the second (PV) pump 20 via the regulator port 60. The decrease circuit 64 acts as a "feedback circuit" for the second (PV) pump 20, essentially redirecting hydraulic fluid 41 from the regulator valve 94 back to the slide 72 via the regulator port 60. When there is little demand from the high pressure work circuit 54, pressure in the high pressure work circuit 54 will begin to rise as the hydraulic fluid 41 begins to backup. Once the backup pressure reaches a certain first threshold, the regulator valve 94 is actuated (or "stroked") to a first position 96 thereby redirecting some of the flow of hydraulic fluid 41 back to the second (PV) pump 20 via the decrease circuit 64. As the pressure in the decrease circuit 64 increases, the eccentricity between the slide 72 and the rotor 82 of the second (PV) pump 20 decreases; as the eccentricity decreases, the chambers 92 also decrease in size, thereby reducing the volume of fluid 41 transferred to the outlet port 90. Consequently, the volume of hydraulic fluid 41 delivered from the second (PV) pump 20 to the high-pressure work circuit 54 decreases (i.e., less flow, same high pressure.)

Figure 4:
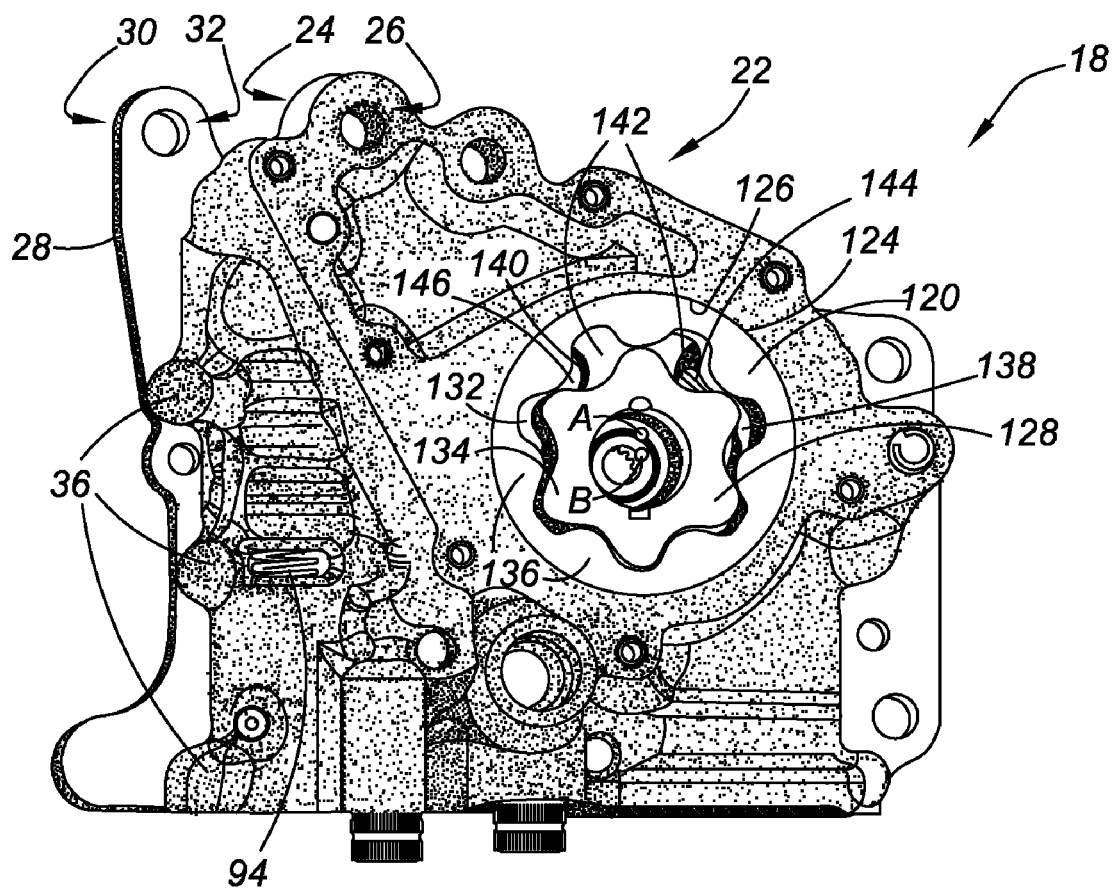
FIG. 4 is a front perspective view of a gerotor-type pump as exemplary of a fixed displacement pump in accordance with the embodiments of FIGS. 1 and 2.

Still referring to FIG. 2, the high pressure circuit portion 50 preferably also includes a main overage circuit 66 fluidly connected to the regulator valve 94 and the inlet port 44. In an instance where the second (PV) pump 20 is fully "de-stroked" (i.e., the eccentricity between the slide 72 and rotor 82 is at its physical minimum), and continues to output more hydraulic fluid 41 than is demanded by the high-pressure work circuit 54, the pressure in the high-pressure work circuit 54 will again start to increase. Once the backup pressure reaches a second threshold, the regulator valve 94 will stroke to a second position 98 and thereby divert surplus hydraulic fluid 41 from the high-pressure circuit 54 to the main overage circuit 66. It is preferred that the main overage circuit 66, in turn, re-direct the hydraulic fluid 41 to the inlet port 44, and not the reservoir 40, in order to avoid "turnover" of the hydraulic fluid 41. Conversely, it is contemplated that the main overage circuit 66 redirect the hydraulic fluid 41 to the reservoir 40 without compromising the scope and intent of the present invention. In this regard, it should be noted that the main overage circuit 66 is more of a backup feature in the regulator valve 94, and is not a critical feature to the functionality of the present invention. In addition, the regulator valve 94 is depicted in FIG. 4 as a single mechanical valve. However, it is within the scope of the present invention to utilize alternative means for regulating the flow of hydraulic fluid 41 to the high-pressure work circuit 54, such as, by way of example, one or more electro-mechanical valves (i.e., a solenoid, not shown), electro-hydraulic valves (not shown), and the like.

In an exemplary embodiment, the first (PF) pump 18 is depicted in FIG. 4 as a gerotor-type lube pump. The gerotor pump 18 includes a ring gear 120 having a cylindrical outside surface 124 cooperating with a cylindrical inside surface 126 of a pump body 22, which supports the ring gear 120 for rotation about a first axis A. A pinion gear 128 of the gerotor pump 18 is disposed inside of the ring gear 120 and coupled to the drive shaft 80 (depicted schematically in FIG. 2) through connection points (not shown) for rotation as a unit with the drive shaft 80 about a second axis B. The first axis A is radially offset at a fixed eccentricity from the second axis B, which creates the eccentric rotational meshing of the two gears 120, 128 commonplace with gerotor type pumps.

The lateral separation between the two axis's A, B defines a crescent shaped cavity 132 between the ring gear 120 and the pinion gear 128, fluidly sealed on opposite sides by both the rear face 16 of the assembly housing 12 and an outboard cap 37 (FIG. 1.) The two ends of the cavity 132 are separated from each other by a pinion gear tooth 134 in full mesh with ring gear teeth 136. The pinion gear 128 has one less tooth than the ring gear 120. With rotation of the ring gear 120 and the pinion gear 128 (indicated by the directional arrows in FIG. 2) a pinion gear tooth 134 cooperates with a ring gear tooth 136 in dividing the cavity 132 into an inlet half 138 and a discharge half 140. The gear teeth 134, 136 on the pinion gear 128 and the ring gear 120 cooperate in defining a plurality of pump chambers 142 of the gerotor pump 18 which expand in the inlet half 138 and collapse in the discharge half 140 of the crescent-shaped cavity 132.

The hydraulic fluid 41 is drawn in through a low-pressure, inlet port 144 into a pumping chamber 142 (at the inlet half 138) that are increasing in volume. Upon further rotation, when the pumping chambers 142 are decreasing in volume, the hydraulic fluid 41 is pushed out through the pump's outlet or discharge port 146 at a higher pressure. The inlet and discharge ports 144, 146, respectively, are separated angularly or "timed" to prevent the pump chambers 142 from simultaneously overlapping both the inlet port 144 and the discharge port 146, as is understood by those skilled in the art.

While the best modes for carrying out the invention have been described in detail, those familiar with the art to which this invention relates will recognize various alternative designs and embodiments for practicing the invention within the scope of the appended claims.

The invention claimed is:

1. A split-pressure hydraulic fluid supply circuit for a multi-speed transmission having a power source and at least one hydraulic fluid reservoir, the split-pressure hydraulic fluid supply circuit comprising:
    a first pump having an inlet port and an outlet port, the first pump being operatively connected to the power source and providing a fixed flow of pressurized hydraulic fluid;
    a second pump having an inlet port, an outlet port, and a regulator port, the second pump being operatively connected to the power source and providing a variable flow of pressurized hydraulic fluid;
    a low-pressure circuit portion including a low-pressure work circuit directly connected to the outlet port of the first pump for supplying low-pressure hydraulic fluid to the multi-speed transmission;
    a high-pressure circuit portion including a high-pressure work circuit directly connected to the outlet port of the second pump for supplying high-pressure hydraulic fluid to the multi-speed transmission, wherein the high-pressure work circuit and the low-pressure work circuit are separate, characterized by an absence of a fluid coupling between the two circuits;
    wherein the low-pressure work circuit is not fluidly coupled to the second pump; and
    wherein the high-pressure work circuit is not fluidly coupled to the first pump.

2. The split-pressure hydraulic fluid supply circuit of claim 1, wherein the second pump comprises a variable displacement pump.

3. The split-pressure hydraulic fluid supply circuit of claim 2, wherein the first pump comprises at least one of a fixed displacement pump and a variable displacement pump.

4. The split-pressure hydraulic fluid supply circuit of claim 3, wherein the first pump supplies hydraulic fluid to the low-pressure work circuit at substantially the same time as the variable displacement pump supplies hydraulic fluid to the high-pressure work circuit.

5. The split-pressure hydraulic fluid supply circuit of claim 4, wherein the low-pressure work circuit supplies only low-pressure fluid at a high flow and the high-pressure circuit portion supplies only high-pressure fluid at either a high flow or a low flow.

6. The split-pressure hydraulic fluid supply circuit of claim 4, wherein the high-pressure circuit portion further includes a decrease circuit fluidly coupled to the regulator port and a regulator valve and not fluidly coupled to the first pump for reducing the flow of fluid to the high-pressure work circuit.

7. The split-pressure hydraulic fluid supply circuit of claim 5, wherein the high-pressure circuit portion further includes an overage circuit that is fluidly coupled to the regulator valve and the inlet port of the second pump and not fluidly coupled to the first pump for reducing the flow of fluid to the high-pressure work circuit.

8. The split-pressure hydraulic fluid supply circuit of claim 7, wherein the at least one hydraulic fluid reservoir is fluidly coupled to both the inlet port of the first pump and the inlet port of the second pump by a pickup circuit.

9. An oil pump assembly, comprising:
a fixed displacement pump configured to supply hydraulic pressure;
a variable displacement pump configured to supply hydraulic pressure;
a regulator;
at least one power source operatively connected to and configured for selectively powering the fixed displacement pump and the variable displacement pump;
at least one reservoir fluidly coupled to and configured for supplying hydraulic fluid to the fixed displacement pump and the variable displacement pump;
a first conduit defining a low-pressure work circuit that is directly coupled to the fixed displacement pump for supplying a continuous flow of low-pressure hydraulic fluid at a fixed rate from said fixed displacement pump, wherein the first conduit is not fluidly coupled to the variable displacement pump;
a second conduit defining a high-pressure work circuit that is directly coupled to the variable displacement pump for supplying a continuous flow of high-pressure hydraulic fluid at variable rates from said variable displacement pump, wherein the second conduit is not fluidly coupled to the fixed displacement pump; and
a third conduit defining a decrease circuit that is fluidly coupled to the regulator and the variable displacement pump for reducing the flow of high-pressure fluid to the high-pressure work circuit.

10. The oil pump assembly of claim 9, wherein the low-pressure work circuit supplies only low-pressure hydraulic fluid at a high rate of flow.

11. The oil pump assembly of claim 10, wherein the high pressure work circuit supplies only high pressure hydraulic fluid at either a high rate of flow or a low rate of flow.

12. The oil pump assembly of claim 9, wherein the decrease circuit is characterized by the absence of a fluid coupling to both the fixed displacement pump and the reservoir.

13. The oil pump assembly of claim 12 further comprising:
a fourth conduit defining an overage circuit that is fluidly coupled to the regulator and the variable displacement pump and not fluidly coupled to the fixed displacement pump for reducing the flow of fluid to the high-pressure work circuit.

14. The oil pump assembly of claim 13, wherein the at least one power source includes at least one power source configured to selectively power the fixed displacement pump, and at least one power source configured to selectively power the variable displacement pump.

15. The oil pump assembly of claim 14, wherein the at least one reservoir is fluidly coupled to both the variable displacement pump and the fixed displacement pump by a fifth conduit defining a pickup circuit.

16. The oil pump assembly of claim 15, wherein the fixed displacement pump comprises of a gerotor pump.

* * * * *